United States Patent [19]

Vandas

[11] 4,226,325
[45] Oct. 7, 1980

[54] CONVEYOR LUBRICATING AND WASHING APPARATUS

[75] Inventor: Edward B. Vandas, St. Louis, Mo.

[73] Assignee: McGraw-Edison Company, Rolling Meadows, Ill.

[21] Appl. No.: 20,674

[22] Filed: Mar. 15, 1979

[51] Int. Cl.³ .................................... B65G 47/22
[52] U.S. Cl. ............................ 198/493; 118/70; 134/58 R; 134/95
[58] Field of Search ............ 198/493, 495, 500, 856; 134/58 R, 59 R, 95; 118/70

[56] References Cited

U.S. PATENT DOCUMENTS 2,805,967  9/1957  Murphy .................... 198/495 X

FOREIGN PATENT DOCUMENTS 2255053  5/1974  Fed. Rep. of Germany .......... 198/500
2307733  11/1976  France ........................... 198/500

*Primary Examiner*—Robert B. Reeves
*Assistant Examiner*—Douglas D. Watts
*Attorney, Agent, or Firm*—Ronald J. LaPorte; Dale A. Kubly; Jon C. Gealow

[57] ABSTRACT

Apparatus for continuously lubricating a conveyor belt with a mixture of water and soap or detergent during normal operation and for washing the conveyor belt during a preselected time interval after normal operation has ceased. Solenoid valves are interposed in water lines to a lubricating nozzle and wash nozzles to control the flow of water to the nozzles, and pumps are provided to inject soap or detergent into each of the water lines. During normal conveyor operation, electrical power is supplied only to the lubricating line solenoid valve and the lubricating line pump to produce a lubricating spray of water and soap or detergent from the lubricating nozzle which is directed onto the belt. When the master on-off switch is switched to the "off" position, a wash timer is actuated for a predetermined interval of time and cooperates with a relay to also enable the wash line solenoid valve and the wash line pump to deliver water and soap or detergent to the wash nozzle for cleansing the conveyor belt.

8 Claims, 3 Drawing Figures

CONVEYOR LUBRICATING AND WASHING APPARATUS

BACKGROUND OF THE INVENTION

This invention relates generally to conveyor systems and, more particularly, to a conveyor lubricating and washing apparatus which is operative to provide a lubricating water and soap mixture between the conveyor belt and the conveyor slider pan and which, after normal conveyor operation has ceased, also operates to direct a spray of hot water and soap or detergent at the conveyor belt for cleansing the belt.

Conveyors are commonly used in institutional settings, such as in the kitchen and dining rooms of hospitals and nursing homes, in connection with the preparation, or make-up, of food trays and for returning used or soiled dishware and utensils from the dinning room to a dishwashing area. When used as a tray make-up conveyor, workers may be stationed at work stations along the length of the conveyor to load the trays as they move past on the conveyor belt and thereby make-up trays of food ready for delivery to patients. When the conveyor is used as a soiled dish conveyor, the trays of dishes or the soiled dishes themselves are returned to the conveyor after the meal and placed on the conveyor belt which transports the tray to the dishwashing area.

Such conveyors typically comprise a continuous fabric belt or a continuous slatted plastic belt trained about a motor-driven drive member at one end and a non-driven rotatable member at the other end. For sanitary reasons and to insure that the conveyor is maintained in good operating condition, apparatus is also commonly provided for cleaning food scraps and the like from the conveyor while it is in use to prevent the buildup and collection of food and other foreign matter on the conveyor belt.

Although the belt and drive mechanisms in early conveyors were usually cleaned manually with brushes, air hoses, water hoses and the like, later developments resulted in automatic wash systems which operate continuously during the operation of the conveyor to eliminate, as much as possible, the costly manual cleaning operations theretofore required.

Such conveyors incorporating automatic washing apparatus are currently available from Seco Products, McGraw-Edison Company, Elgin, Illinois, the assignee of the present invention. Typically, a wash tank is provided at one end of the conveyor, and the conveyor is equipped with soap injection and water spray systems which automatically wash the belt when the conveyor is in operation. The water and soap injection system also extends to the tail section of the conveyor and includes nozzle for spraying the underside of the belt with a mixture of water and detergent to lubricate the belt and reduce friction as the belt rides along a bed, or slider pan, underlying the belt, the belt riding on a thin film of water and detergent on the bed. Excess water is collected in an underlying drain pan.

Other conveyor belt wash systems have been shown in the prior art and, in particular, U.S. Pat. No. 2,266,309, issued to Cohen, shows the use of opposed high pressure water discharge sprays against opposite faces of the conveyor belt and pump means which are used to generate the spray pressure. U.S. Pat. No. 2,541,403, issued to Carl, shows a soiled dish conveyor that utilizes a bath wash in combination with powered brushes operating against both faces of the conveyor to clean the belt and a trough located in the support base under the tail section of the belt into which small amounts of water are continuously fed to lubricate the belt as it passes through the trough.

However, these and other conveyor washing systems heretofore used, operate continuously during normal operation of the conveyor to continuously wash the belt. It has been found, however, that excessive amounts of water, particularly hot water, are required to continuously wash the conveyor belt and that continuous washing is not easily necessary. Accordingly, it is desirable to provide a conveyor which is cleansed at the end of its normal operating cycle, but which is continuously lubricated to reduce friction between the belt and the slider pan, or bed, during normal operation.

SUMMARY OF THE INVENTION

Therefore, in accordance with the principles of the present invention, the conveyor lubricating and washing apparatus hereinafter described includes apparatus for controlling the wash and lubrication cycles of the apparatus independently of each other to provide a wash cycle only during a predetermined time interval after the conveyor is initially turned off after normal operation.

In one embodiment, the apparatus includes a first solenoid-actuated valve interposed in a water line from a cold water supply to the lubricating nozzle and a second solenoid-actuated valve interposed in the water line from the hot water supply to the wash line nozzles. Electric pumps, having respective inputs immersed in a soap or detergent reservoir and respective outputs coupled to the hot water line and the cold water line, are selectively energized by the control apparatus to inject detergent into the water lines to provide a lubricating mixture of cold water and detergent and a washing mixture of hot water and detergent. The control apparatus includes a master switch having a first, normally closed contact coupling a wash timer and the first and second normally open contacts of a relay to an input power line in the motor starter. The second, normally open contact of the master switch is coupled to the other side of one of the relay contacts and to the motor starter. When the master switch is actuated to initiate normal operation of the conveyor, the normally open contact is closed and the normally closed contact is opened such that the motor starter is energized to drive the motor which, in turn, drives the conveyor belt along the slider pan of the conveyor. Upon energization of the motor starter, the lubricating line solenoid valve and pump are actuated such that a mixture of cold water and detergent is sprayed from the lubricating nozzles to lubricate the conveyor belt. At the end of normal operation, the master switch is deactuated and the normally closed contact closes to supply electrical power through the wash timer to the relay contacts and to the relay coil. The normally open relay contacts are closed by the energized relay coil to couple electrical power to the motor starter and thereby maintain the conveyor belt motor enabled. The wash timer maintains the relay coil energized for a predetermined time interval, for example, five minutes, after the master switch is deactuated, and during this time, electrical power is also coupled through the other closed relay contact to the solenoid-actuated valve in the hot water line and to the wash line pump. Thus, during the predetermined interval established by the wash timer, a cleansing mixture of hot water and soap or detergent is delivered to the wash line nozzles and sprayed at the conveyor belt to cleanse the belt as it is transported past the nozzles by the conveyor belt motor. At the end of the wash cycle, the wash timer opens to disable the relay and the solenoid-actuated valve in the hot water line and the wash line pump.

Accordingly, the conveyor lubricating and washing apparatus of the present invention reduces the consumption of water and detergent by limiting the wash cycle to a predetermined interval after normal operation of the conveyor has ceased. Since a typical conveyor has three nozzles in the wash tank and at least one nozzle in the tail housing, water consumption is reduced by maintaining the wash nozzles disabled during normal operation. Further, because the apparatus of the present invention utilizes cold water for lubrication purposes, hot water is reserved for washing use only and energy costs associated with heating the water are reduced.

BRIEF DESCRIPTION OF THE DRAWINGS

The features of this invention which are believed to be novel are set forth with particularity in the appended claims. The invention, together with its further objects and the advantages thereof, may be best understood, however, by reference to the following description taken in conjunction with the accompanying drawings, in which like reference numerals identify like elements in the several figures and in which:

DETAILED DESCRIPTION

Figure 1:
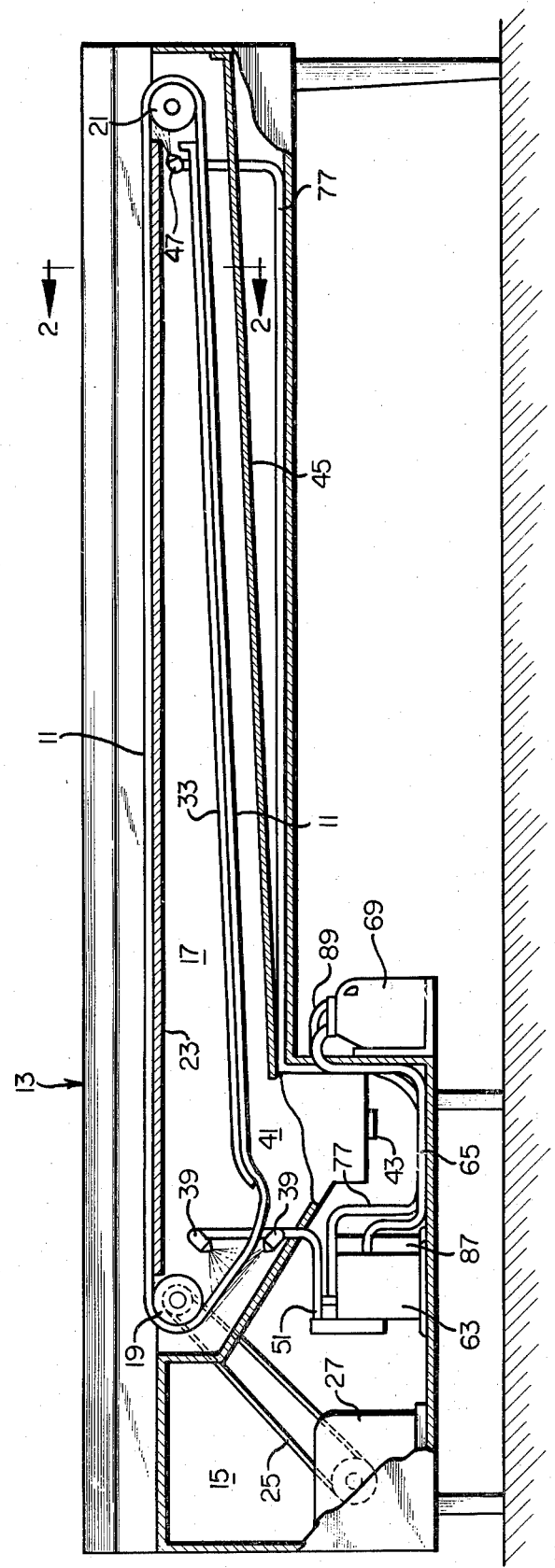
FIG. 1 is a side elevational view, partly in section, showing the conveyor lubricating and washing apparatus of the present invention installed in a typical conveyor.
Figure 2:
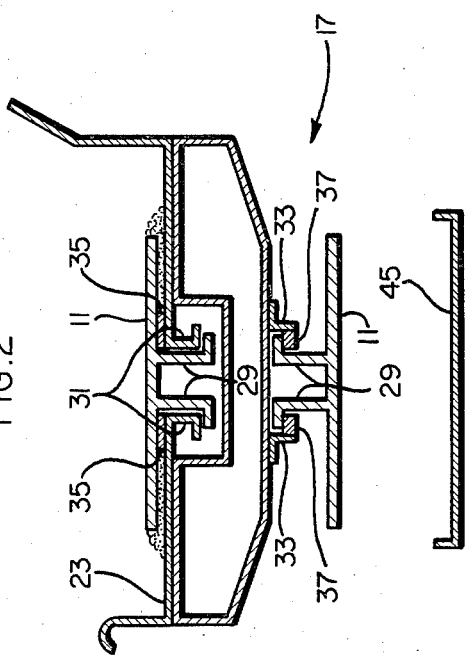
FIG. 2 is a partial sectional view taken along line 2—2 in FIG. 1 showing the lubrication of the conveyor belt as it slides on the slider pan of the conveyor.

Referring now to the drawings, the particular conveyor shown in FIGS. 1 and 2 includes an endless conveyor belt 11 and a cabinet 13 which comprises, for example, a drive housing 15 wherein apparatus for driving the conveyor belt is housed and a tail housing 17 extending from the drive housing and along which the belt moves during normal operation. The conveyor belt 11 is trained about a drive sprocket 19 in the drive housing and a non-driven sprocket 21 in the tail housing and slides on a slider pan 23 forming the top wall of the tail. A chain 25 couples the drive sprocket 19 to an electric motor 27, the electric motor 27 driving the sprocket 19 to transport the belt about the sprockets 19 and 21. The conveyor belt 11 may comprise, for example, a fabric belt or a slatted belt made from a plastic-like material with the top, or outer, surface of the belt being substantially flat for receiving and carrying trays, soiled dishes and the like. A track engaging member 29 provided on the other, or inner, surface of the belt engages a track 31 provided in the slider pan of the tail and, on its return run, a lower return track 33. Stainless steel wear pads 35 and 37 may also be provided.

A plurality of wash line nozzles 39, or other fluid dispensing means, are positioned above and below the conveyor belt 11 in a wash tank 41 in the cabinet to direct sprays of hot water mixed with soap or detergent at both sides of the belt and thereby wash food scraps and other debris from the belt as it travels between the wash line nozzles. Excess wash water is collected in the wash tank 41 and periodically released through a drain opening 43. As the conveyor belt 11 moves toward the end of the tail section of the conveyor, additional wash water drips from the belt and is collected in a stainless steel drip pan 45 which is sloped to deliver the collected water to the drain tank 43.

A fluid dispensing nozzle 47 is also provided in the tail of the conveyor housing adjacent the non-driven sprocket 21 to spray a mixture of cold water and soap or detergent onto the bottom side of the conveyor belt to lubricate the belt and reduce friction between the belt 11 and the slider pan 23 on which the belt travels during normal conveyor operation. Additional lubricating nozzles (not shown) may be provided to provide further lubrication at selected points along the travel of the conveyor belt.

Figure 3:
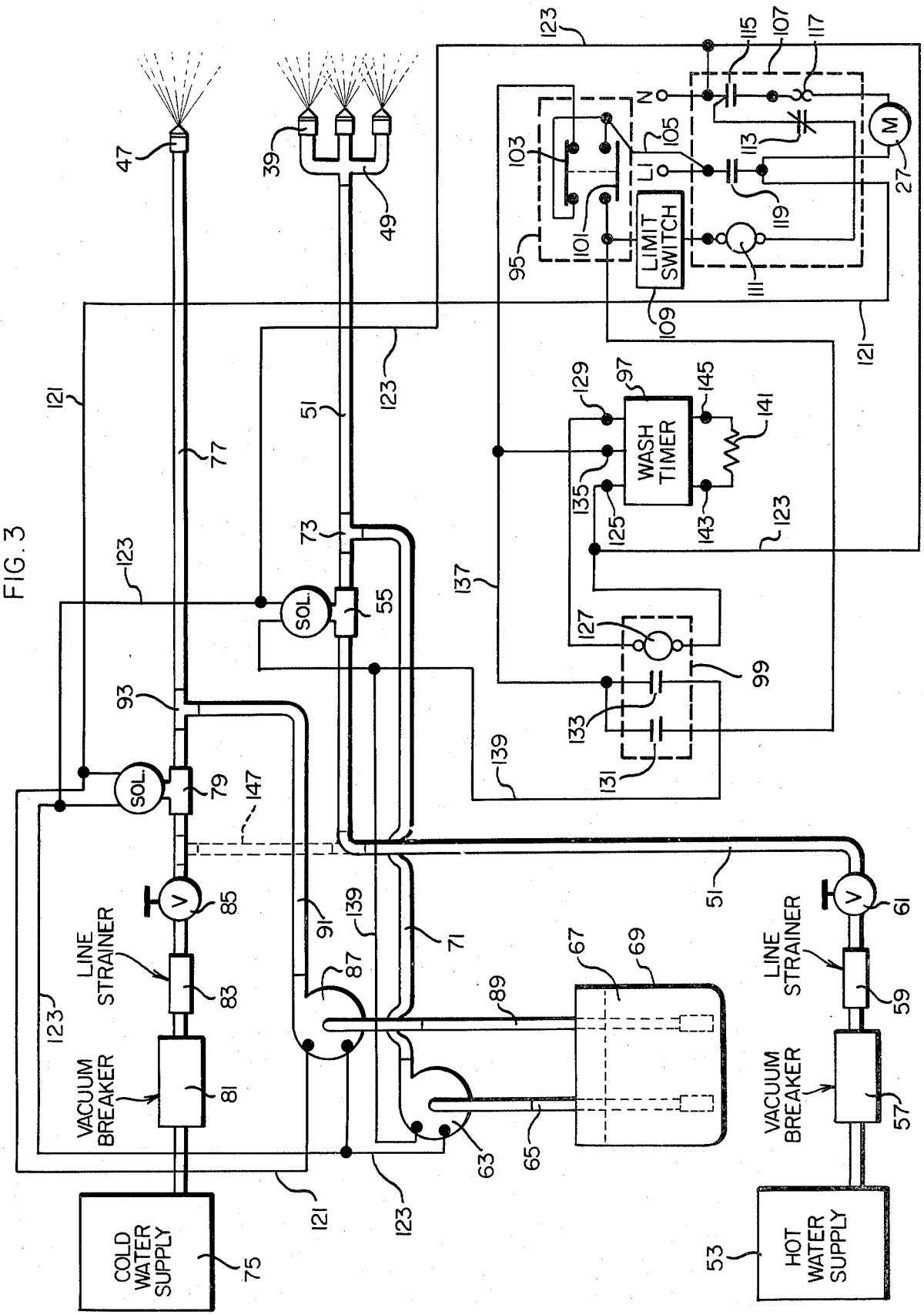
FIG. 3 is a schematic diagram showing the plumbing connections and electrical circuitry for controlling the lubricating and washing apparatus.

With reference now also to FIG. 3, a manifold 49 couples the wash line nozzles 39 to a water line 51 which, in turn, is coupled to a hot water supply 53. A normally closed solenoid valve 55 is interposed in the water line 51 to control the flow of hot water through the water line to the wash line nozzles 39. A vacuum breaker 57 may be interposed in the hot water wash line 51 to prevent the introduction of used water into the system from other systems coupled to the hot water supply, and a line strainer 59 may also be interposed in the water line between the hot water supply and the solenoid valve 55 to filter sediment and other undesirable materials from the water flow to prevent clogging of the solenoid valve. A shut-off valve 61 may also be provided in the water line to manually close the flow of water to the wash line nozzles. Prior to its discharge through the nozzles 39, soap, or detergent, is added to the hot water. In the present embodiment, for example, the soap or detergent is introduced into the hot water line 51 at a point after the solenoid valve 55 by an electric pump 63 having an input line 65 immersed in a reservoir of detergent or soap 67 in a container 69 and having an output line 71 coupled to the wash line 51 by a connecting T member 73.

Similarly, the lubricating nozzle 47 is coupled to a cold water supply 75 by a water line 77. A second solenoid valve 79 is interposed in the cold water line 77 to control the flow of cold water through the line. The cold water line 77 may also be provided with a vacuum breaker 81, a line strainer 83 and a shut-off valve 85 interposed in the water line intermediate the cold water supply 75 and the solenoid valve 79. A second electric pump 87 having an input line 89 immersed in the soap reservoir 67 is provided to pump soap or detergent from the reservoir and through an output line 91 of the pump to a connecting T member 93 interposed in the cold water line 77, for example, between the solenoid valve 79 and the lubricating nozzle 47.

In accordance with one aspect of the present invention, the wash line and lubricating line solenoid valves, 55 and 79, respectively, the electric wash line pump 63, and the electric lubricating line pump 87 are electrically controlled by a master switch 95, a wash timer 97 and a relay 99 to continuously lubricate the conveyor belt during normal operation of the conveyor and, for a predetermined time interval after normal operation has ceased and during which the wash line pump 87 and the solenoid valve 55 are enabled, to wash the conveyor belt. That is, during normal conveyor operation, the lubricating line solenoid valve 79 is open and the lubricating line pump 63 is actuated to provide a lubricating mixture of cold, or unheated, water and soap or detergent through the lubricating line nozzle 47 to the belt. When the master switch 95 is turned to the "off" position at the end of the operating day, the wash timer 97 cooperates with the relay 99 to maintain the conveyor belt drive motor 27 operative to drive the belt 11 and to simultaneously open the wash solenoid valve 55 and energize the electric wash line pump 63. During this time interval, for example, in the order of five minutes, the conveyor belt is cleaned by the wash line nozzles 39 and prepared for use during the next day's operation.

More particularly, the master switch 95 comprises a double-pole double-throw switch having a normally open contact 101 and a normally closed contact 103. One terminal of each contact, 101 and 103, is coupled to the power line L1 in the motor starter 107 by a conductor 105, and the other terminal of contact 101 is coupled through one or more belt control limit switches 109 to one side of the motor starter coil 111. The other side of the motor starter coil 111 is coupled through a normally closed contact 113 in the motor starter to the neutral input power line N and to one side of a normally open motor starter contact 115. The other terminal of the normally open contact 115 is coupled through a thermal overload relay 117 to one drive input of the conveyor drive motor 27. The other drive input terminal of the conveyor motor 27 is coupled to the power line L1 by a normally open contact 119 and to the lubricating line solenoid valve 79 and to the electric lubricating pump 87 by conductor 121. The wash pump 63, the lubricating pump 87, the lubricating line solenoid valve 79, and the wash line solenoid valve 55 are referenced to the neutral power line N at the motor starter 107 via conductor 123.

The neutral power line N into the motor starter 107 is also coupled to a first terminal 125 of the wash timer 97 and to one end of the iron core relay coil 127, the other side of the relay coil being coupled to terminal 129 of the wash timer. The relay 99 further comprises a pair of normally open contacts, 131 and 133, coupled to a third timer terminal 135 and to one side of the normally closed contact 103 of the master switch by the conductor 137 and through the master switch contact 95 to the power line L1. The other side of the normally open relay contact 131 is coupled to the normally open master switch contact 101, and the corresponding terminal of the second normally open relay contact 133 is coupled by a conductor 139 to the wash solenoid valve 55 and the wash line pump 63.

A resistor 141 is coupled between terminals 143 and 145 of the wash timer to set the timing interval during which time the wash timer terminals 129 and 135 are electrically interconnected in the timer, but it will be understood that a potentiometer can be substituted for resistor 141 to permit the timing interval to be varied.

In operation, when the conveyor is turned "on" at the start of the operating day, the master switch 95 is actuated to close the normally open contact 101 and open the normally closed contact 103 of the master switch and thereby initiate normal operation. The circuit from the L1 line to the motor starter coil 111 is then completed through the closed master switch contact 101 and the normally closed limit switch 109 while the other terminal of the motor starter coil 111 is coupled through the normally closed motor starter contact 113 to the neutral input power line N causing the iron core motor starter coil 111 to be energized to close the normally open contacts 115 and 119 of the motor starter. Upon closure of the contacts 115 and 119, one input terminal of the conveyor motor 27 is coupled through the now closed contact 119 to the power line L1 and the other input to the motor is coupled to the neutral line N through the thermal overload relay 117 and the now closed contact 115. The conveyor motor 27 is thereby actuated and operative to drive the conveyor belt 11.

Simultaneously, the lubricating line solenoid valve 79 and the lubricating line pump 87 are coupled to the power line L1 by conductor 121 and the now closed motor starter contact 119, and the solenoid valve is opened to allow cold water to flow through the cold water line 77. The electric lubricating line pump 87 is also enabled and pumps soap, or detergent, from the resevoir 67 into the lubrication line 77 through the T member 99. Accordingly, a soapy water mixture is sprayed from the lubricating line nozzle 47 to lubricate the belt 11 and provide a thin, soapy film between the belt and the conveyor slider pan 23. It will be understood that during normal operation of the conveyor, the normally open relay contact 133 remains open and power is not applied to the wash solenoid valve 55 or to the wash line pump 63, and therefore, no water or soap is dispensed from the wash line nozzles 39.

At the end of the operating day, the master switch 95 is turned to the "off" position and the normally open contact 101 reopens and the normally closed contact 103 recloses. Electrical power is thereafter coupled from the power line L1 through the normally closed master switch contact 103 to the terminal 135 of the wash timer 97 and to one side of the open relay contacts 131 and 133 via conductor 137. The construction and operation of the wash timer 97 is such that an internal closed electrical circuit exists between the terminals 129 and 135 of the wash timer for a predetermined interval of time after the master switch is thrown from the "on" position to the "off" position. For example, the timer may be preset to provide a five minute wash interval during which the wash timer contacts 129 and 135 are electrically interconnected, and thus, the relay 99 is coupled through the wash timer 97 to the power line L1 and energized thereby during this interval. A power supply line from the L1 line to the motor starter coil 111 is also established through the master switch contact 103, the wash timer 97, the closed relay contact 131 and the limit switch 109 to maintain the motor starter 107 energized. As a result electrical power is supplied to the conveyor belt motor 27 for the wash time interval even after the master switch contact 101 opens, and the conveyor belt 11 continues to move past the wash line nozzles 39.

An operating voltage, or potential, is also supplied to the wash solenoid valve 55 and to the wash line pump 63 through the now closed relay contact 133 to enable these devices for the first time, it being understood that the lubricating line pump 87 and the lubricating line solenoid valve 79 also remain energized during this time interval. During the interval in which the wash timer 97 enables the relay 99, the wash solenoid valve 55 and the wash line pump 63 are enabled to provide a spray of hot water and soap or detergent from the wash line nozzles 39 for cleansing the belt in preparation for operation the following day.

At the end of the operating cycle of the wash timer 97, the internal electrical connection between terminals 129 and 135 of the wash timer opens to deenergize the relay coil 127. Upon deenergization of the relay coil 127, relay contact 131 opens to disconnect the motor starter 107 from the power line L1 and thereby disable the conveyor motor 27 and consequently the lubricating line solenoid valve 79 and pump 87. Relay contact 133 also opens to disconnect the wash solenoid valve 55 and the wash line pump 63 from the power supply line L1. The conveyor, including the wash apparatus, is then disabled until the system is again enabled the next day by means of the master switch 95.

Accordingly, the conveyor lubricating and washing apparatus of the present invention controls the wash and lubricating nozzles as separate systems, providing a spray of hot water and detergent for cleaning the conveyor belt for only a short interval after the master switch is turned to the "off" position in preparation for the next day's activities and a continuous spray of soap or detergent and cold water to the conveyor belt to reduce friction between the belt and the slider pan. By eliminating the operation of the wash tank nozzles during normal operation, the apparatus of the present invention reduces the consumption of water and, in particular, hot water, and soap or detergent. Further, because the lubricating portion of the apparatus is operated independently of the wash line portion, cold water can be used for lubrication and hot water is used only during the wash cycle. Thus, the cost of heating water is reduced.

Although substantial savings of energy may be realized with the particular embodiment just described, it should be understood that the apparatus may be modified in several respects without departing from the principles of the present invention. For example, in certain applications, it may be desirable to couple the lubricating line 77 to the hot water supply 53 and eliminate the connection to the cold water supply and the associated plumbing hardware required to make this connection. Thus, a water line 147, shown in dashed lines in FIG. 3, may be run from the hot water line 51 to the lubricating line 77 with appropriate connectors. Further, with the addition of appropriate metering and bypass devices, the pumps 63 and 87 may be replaced by a single pump having outputs coupled to both of the water lines, 51 and 77, and the relay 99 may be replaced by a solid-state switching circuit. It also should be understood that the present apparatus can easily be adapted for use in multiphase power applications and with silicon controlled rectifier (SCR) motor controls.

Accordingly, while a particular embodiment of the present invention has been shown and described, it will be obvious to those skilled in the art that various changes and modifications may be made without departing from the invention in its broader aspects. The aim in the appended claims is to cover all such changes and modifications which may fall within the true spirit and scope of the invention.

What is claimed is:

1. In a conveyor apparatus having a conveyor belt and a motor selectively enabled by motor control means coupled to input power lines for driving said belt along a slider means and further having first lubricating fluid dispensing means for directing a lubricating mixture of detergent and water at said belt for reducing friction between said conveyor belt and said slider means and second washing fluid dispensing means for directing a washing mixture of detergent and water at said belt for cleansing said belt, each of said fluid dispensing means being coupled to water supply means by respective first and second water lines and to a detergent reservoir, control apparatus comprising:

first electrically controlled valve means interposed in said first water line for controlling the flow of water through said first water line from said water supply means to said first fluid dispensing means;

second electrically controlled valve means interposed in said second water line for controlling the flow of water through said second water line from said water supply means to said second fluid dispensing means;

pump means having input means coupled to said detergent reservoir and output means coupled to said first and second water lines for delivering detergent to said water lines;

master switch means coupled to said motor control means and to said first electrically controlled valve means and said pump means, said master switch means being actuable to a first switch position to energize said motor control means and enable said conveyor motor and to enable said pump means and open said first electrically controlled valve means to allow water and detergent to be dispensed from said first fluid dispensing means to lubricate said conveyor belt;

switch means having first normally open circuit means coupled to said motor control means and second normally open circuit means coupled to said second electrically controlled valve means and said pump means; and wash timer means coupled to said master switch means and said switch means for closing said first and second normally open circuits of said switch means for a predetermined time interval after said master switch means is switched form the first switch position to a second switch position, said switch means opening said second electrically controlled valve means and energizing said pump means during said predetermined time interval responsive to said wash timer means to allow water and detergent to be dispensed from said second fluid dispensing means to wash said conveyor belt and maintaining said motor control means energized to enable said motor to move said conveyor belt past said second fluid dispensing means.

2. Apparatus in accordance with claim 1 wherein said switch means comprises a relay having first and second normally open contacts and a relay coil, said relay coil being coupled to said wash timer means and selectively energizable by said wash timer means during said predetermined time interval to close said first and second contacts, said first contact being coupled between said master switch means and said motor control means to maintain said motor control means energized during said predetermined time interval and said second contact coupling said master switch means to said second electrically controlled valve means and said pump means, said second contact being closed by said relay coil during said predetermined time interval to energize said pump means and open said second electrically controlled valve means.

3. Apparatus in accordance with claim 2 wherein said wash timer means includes first and second terminals and means for electrically interconnecting said first and second terminals during said predetermined time interval, said relay coil being coupled to said first wash timer terminal and said second terminal being coupled to said input pwoer line through said master switch means.

4. Apparatus in accordance with claim 3 wherein said master switch means includes a first normally open contact coupled between said motor control means and said input power line for energizing said motor control means responsive to closure of said first normally open contact during normal operation and a second normally closed contact coupled between said second wash timer terminal and said input power line, said second normally closed contact being open during normal operation and closed after said master switch means is switched to the second switch position after normal operation has ceased, said relay coil being coupled to said input power line through said wash timer and said second master switch contact during said predetermined time interval.

5. Apparatus in accordance with claim 1 wherein said motor control means comprises a motor starter circuit having first and second normally open contacts coupling said motor between said input power lines and further having coil means coupled to said first master switch contact, said motor starter coil means being energized upon closure of said first master switch contact to close said first and second motor starter contacts and enable said motor during normal operation, said motor starter coil also being coupled to said first relay contact and energized through said second master switch contact and said first relay contact during said predetermined time interval.

6. Apparatus in accordance with claim 3 wherein said wash timer means includes means for adjusting the duration of said predetermined time interval.

7. Apparatus in accordance with claim 1 wherein said water supply means provides cold water to said first water line and hot water to said second water line and wherein said pump means comprises a first electric pump having an input line coupled to said detergent reservoir and an output line coupled to said cold water line and a second electric pump having an input line coupled to said detergent reservoir and an output line coupled to said hot water line.

8. Apparatus in accordance with claim 1 wherein said first and second electrically controlled valve means comprise first and second solenoid valves.

* * * * *